M. H. LUKENS.
DIES FOR CUTTING THREADS.
APPLICATION FILED JUNE 20, 1911.

1,020,996.

Patented Mar. 26, 1912.

2 SHEETS—SHEET 1.

Witnesses:
Patrick D. Walsh.
Hilda A. Lundberg

Inventor:
Milton H. Lukens,
By his Attorney, Oscar Perrigo

M. H. LUKENS.
DIES FOR CUTTING THREADS.
APPLICATION FILED JUNE 20, 1911.

1,020,996.

Patented Mar. 26, 1912.

2 SHEETS—SHEET 2.

Witnesses:
Patrick D. Walsh.
Hilda A. Landberg

Inventor:
Milton H. Lukens,
By his Attorney, Oscar A. Perrigo

UNITED STATES PATENT OFFICE.

MILTON H. LUKENS, OF MARBLEHEAD, MASSACHUSETTS.

DIES FOR CUTTING THREADS.

1,020,996.   Specification of Letters Patent.   Patented Mar. 26, 1912.

Application filed June 20, 1911. Serial No. 634,374.

*To all whom it may concern:*

Be it known that I, MILTON H. LUKENS, a citizen of the United States, residing at Marblehead, in the county of Essex and State of Massachusetts, have invented a new and useful Improvement in Dies for Cutting Threads, of which the following is a specification.

My invention relates to improvements in dies for cutting threads upon metal pipe and other cylindrical pieces of metal.

Heretofore such threads have usually been cut in one of three ways, namely, first, by a die composed of a solid piece of metal in the center of which is a threaded hole, having grooves cut at right angles to the threads for the purpose of providing cutting edges; second, with a die composed of two parts as might be produced by dividing the die above described on a line parallel to the axis of the threaded hole, and thus adapted to be adjusted somewhat to the diameter of the piece to be threaded; and, third, by two or more radial bars whose inner ends are threaded and which are held in slots and thus adapted to be adjusted within reasonable limits to the diameter of the piece to be threaded. But in either of these methods the die is adapted to cut only one pitch of thread.

The object of my invention is to provide multiple dies adapted to cut threads of different diameters, and of several different pitches of threads, upon cylindrical pieces of metal, whether the threading operations are performed entirely by hand or in a machine operated by power. I attain these objects by means of the mechanism illustrated in the accompanying drawing in which—

Figure 1:
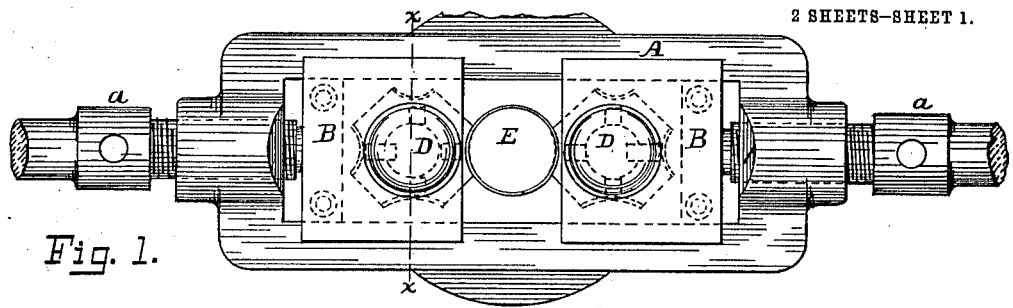
Figure 2:
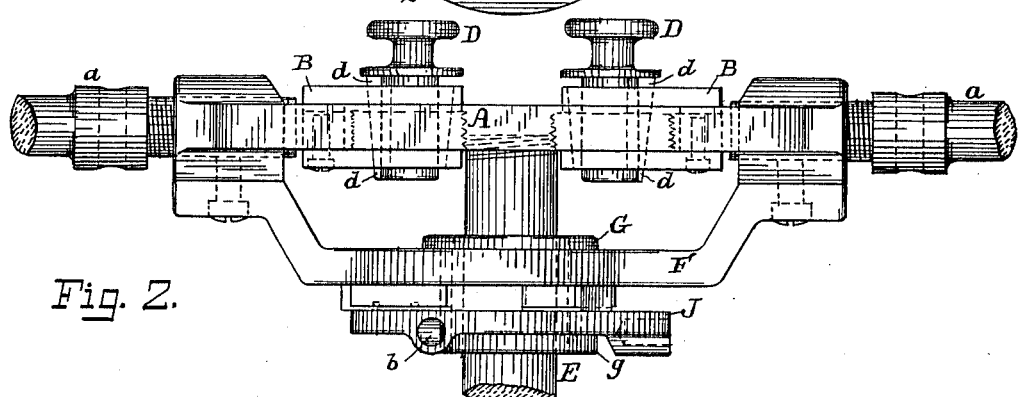
Figure 5:
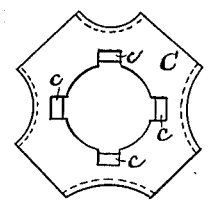
Figure 6:
Figure 3:
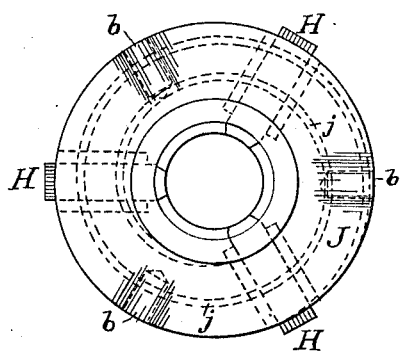
Figure 4:
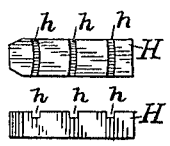
Figure 7:
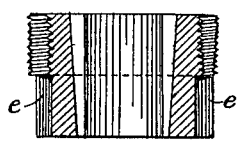
Figures 8, 9:
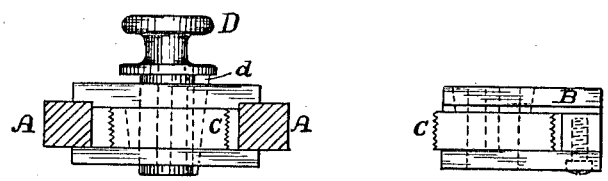
Figure 10:
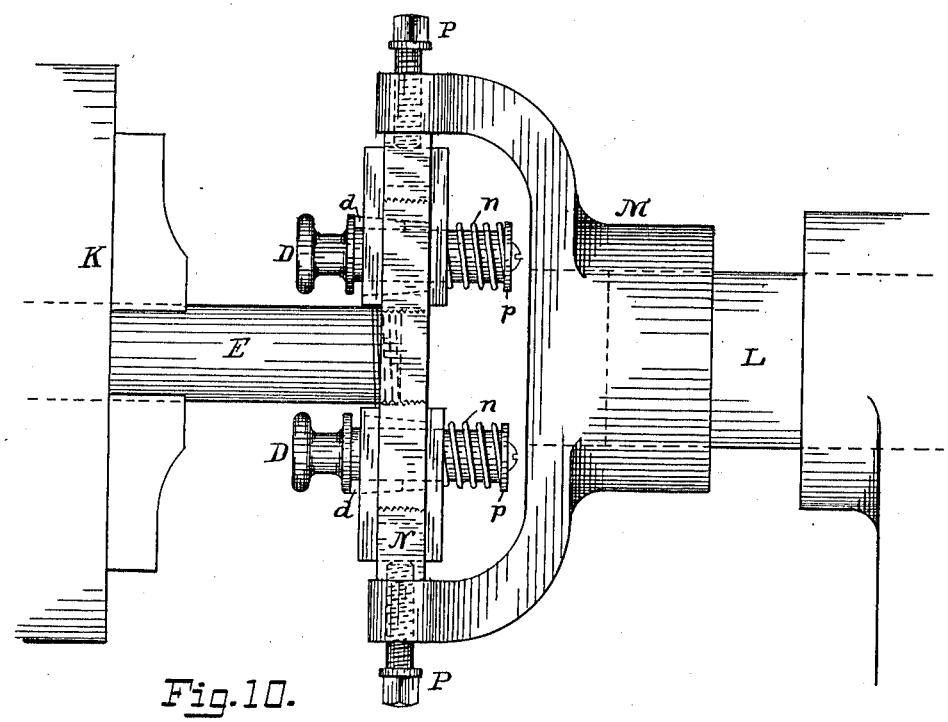

Figure 1 is a plan or top view of my device as adapted to be used by hand; Fig. 2 is a side elevation of the same; Fig. 3 is a bottom view of the centering device; Fig. 4 is a plan and side elevation of one of the jaws of the centering device; Fig. 5 is a plan of one of the dies on an enlarged scale; Fig. 6 is a vertical section of said die; Fig. 7 is a vertical section of the said die in a modified form; Fig. 8 is a cross section of my device on the line $x$ $x$, Fig. 1; Fig. 9 is a side elevation of the die and die holder shown in Fig. 8; and Fig. 10 is a side elevation of my device as adapted for use in a machine operated by power.

Similar letters refer to similar parts throughout the several views.

A is a frame in which is fitted the sliding die holders B B, constructed and arranged as shown in Figs. 1, 2, 8 and 9, by which construction the dies C C are placed between the upper and lower members of said holder and secured by the pivot pins D D. The die holders B B are secured in position with reference to each other and adjusted as may be desired by the handles $a$ $a$, fitted in threaded holes in the frame A, as usual in hand threading devices.

The threading dies, instead of being made of square or rectangular form with one set of threaded surfaces, conform somewhat to a circle and have two or more threaded surfaces, (in this case four such surfaces,) each cut with a thread of different pitch. Through the center of the die is a circular hole for the pivot pins D D, and rotating upon which permits either of the threaded surfaces to be brought into active position as required. To secure the said dies in any desired position the slots $c$ $c$ are formed about the central hole and tapering keys $d$ $d$ fixed in a suitable slot or spline in the pivot pins D D.

E is the cylindrical piece to be threaded. Two dies being provided, and located opposite each other the strain and resistance is equal on each side of the piece, making the operation of cutting as simple and practical as in the present form of dies.

For the purpose of sustaining the piece to be threaded in a proper position the centering device shown in Figs. 2 and 3 is provided. The centering device support F is fixed to the under side of the frame A and perforated to receive the bushing G which is secured in place by the annular nut $g$. Sliding in suitable grooves formed on the under side of the support F are placed the radial jaws H H H, constructed as shown in Figs. 3 and 4. Fitted to and rotating around the bushing G is the centering plate J, which has formed upon its upper surface a raised rib $j$ in involute form and fitting into the grooves $h$ in the jaws H in a similar manner to that in the well known scroll chuck. At suitable intervals around the periphery of the centering plate $j$ are the holes $b$ $b$ $b$, adapted to receive a short cylindrical rod or handle by which the plate may be rotated and the radial jaws H moved simultaneously to or from the center as desired.

The operation of my hand device for thread cutting is as follows: The pitch of the desired thread being known the pivot pins D D are withdrawn and the dies C C rotated until the proper thread surfaces are opposite each other when the pivot pins D D are forced tightly into place, securing the dies C C in the proper position by means of the keys d d. The device is now placed upon the piece to be cut in the position shown in Fig. 2 and the centering plate rotated until the jaws H H H come in contact with it. By means of the threaded handles a a the dies are brought into cutting position, care being used to have the horizontal center line of the handles at right angles to the piece to be threaded. The threading operation may now be proceeded with in the usual manner, forcing the dies together by the use of the threaded handles as may be necessary.

When the cutting edges of the dies become dulled from use, it is only necessary to grind the flat surfaces between the threaded surfaces to restore the sharp cutting edges to condition for use.

When threads are to be cut on quite small rods or pipe the dies C are constructed as shown in Fig. 7, in which case they are made much deeper, and only a portion of the thickness devoted to the threaded surface, the lower portion being formed in concave surfaces e e of the same radius as the bottom of the thread of the threaded portion, thus providing ample support and rendering the centering device described above unnecessary.

To adapt my device for use in a machine operated by power I provide the mechanism shown in Fig. 10. The piece E to be threaded is shown held in an ordinary chuck K of a lathe. Fixed upon the rear spindle L is the die supporting frame M, to which is fixed the side bars N corresponding to the frame A, Figs. 1 and 2 and carrying the die holders B B which, with the dies C C are constructed in the same manner as before described. The dies are adjustable to or from the center by means of the set screws P P, in a similar manner to that used in the hand device by the handles a a.

To render the change of the dies from one pitch of thread to another more convenient the pivot pins D D are provided with much shorter keys d d, and upon their inner ends are placed the spiral springs n n, secured by the washers p p, by which construction the pivot pins may be withdrawn a short distance, the dies rotated to the desired positions, and the pins, upon being released are drawn into place by the action of the springs n n.

What I claim and desire to secure by Letters Patent is:

1. The combination of two rotatable thread cutting dies centrally pivoted to sliding blocks placed opposite each other, said dies adapted to cut two or more threads of different pitches, and having two or more keyways cut around their central holes, pivot pins for pivoting said dies and having tapering keys fixed thereto and adapted to enter said keyways, with sliding blocks one portion of which is above and one portion below said dies, and having two or more keyways cut around the central hole and adapted to receive said pivot pins and their taper keys, and a frame adapted to receive and support said sliding blocks and to adjust them to and from each other by threaded handles forming a part thereof, substantially as described and for the purposes set forth.

2. In a thread cutting device adapted to be operated by hand or power, and consisting essentially of two rotatable thread cutting dies centrally pivoted to sliding blocks placed opposite each other, the combination of two or more tapering keyways cut around their central holes, pivot pins for pivoting said dies and having tapering keys fixed thereto and adapted to enter said keyways, and a frame adapted to receive and support said sliding blocks and to adjust them to and from each other, substantially as and for the purpose described.

MILTON H. LUKENS.

Witnesses:
OSCAR E. PERRIGO,
HILDA A. LUNDBERG.

---

Copies of this patent may be obtained for five cents each, by addressing the "Commissioner of Patents, Washington, D. C."